US 7,906,606 B2

United States Patent
Niesten et al.

(10) Patent No.: US 7,906,606 B2
(45) Date of Patent: Mar. 15, 2011

(54) MOISTURE-CURING PREPOLYMERS

(75) Inventors: Meike Niesten, Köln (DE); Christoph Irle, Barcelona (ES); Federico Comajuan, Teia (ES); Maria Almató Guiteras, Barcelona (ES); Amadeo Vicente, Barcelona (ES)

(73) Assignee: Bayer MaterialScience AG, Leverkusen (DE)

( * ) Notice: Subject to any disclaimer, the term of this patent is extended or adjusted under 35 U.S.C. 154(b) by 527 days.

(21) Appl. No.: 11/087,463

(22) Filed: Mar. 23, 2005

(65) Prior Publication Data
US 2005/0222292 A1    Oct. 6, 2005

(30) Foreign Application Priority Data
Apr. 1, 2004    (DE) .................. 10 2004 015 986

(51) Int. Cl.
*C08G 18/10*    (2006.01)
(52) U.S. Cl. .............. 528/59; 528/67; 528/76; 544/222; 560/25; 560/26; 560/359; 560/360
(58) Field of Classification Search .................... 560/25, 560/26, 359, 360; 544/222; 528/59, 67, 528/76
See application file for complete search history.

(56) References Cited

U.S. PATENT DOCUMENTS

| 5,064,960 A | 11/1991 | Pedain et al. ................. 544/222 |
| 5,545,601 A | 8/1996 | Le-Khac ....................... 502/156 |
| 5,627,120 A | 5/1997 | Le-Khac ....................... 502/156 |
| 5,637,673 A | 6/1997 | Le-Khac ....................... 528/405 |
| 5,723,564 A | 3/1998 | Schmalstieg et al. ........... 528/73 |
| 5,789,626 A | 8/1998 | Le-Khac ....................... 568/620 |
| 6,515,125 B1 * | 2/2003 | Slack et al. ................... 544/222 |
| 2003/0153712 A1 * | 8/2003 | Ludewig et al. ................ 528/10 |
| 2003/0208025 A1 | 11/2003 | Miskovic et al. ............... 528/44 |
| 2004/0024213 A1 * | 2/2004 | Brahm et al. ................. 544/193 |
| 2005/0020706 A1 * | 1/2005 | Kollbach et al. ................ 528/59 |

* cited by examiner

*Primary Examiner* — John Cooney
(74) *Attorney, Agent, or Firm* — Robert S. Klemz; Noland J. Cheung

(57) ABSTRACT

Solvent-containing formulations including NCO-containing prepolymers based on TDI isocyanurate polyisocyanates and diphenylmethane diisocyanates where some prepolymers are prepared using a polyetherdiol containing ethylene oxide blocks and having an ethylene oxide content of from 2 to 18% by weight, based on all the alkylene oxide units. The formulation have an NCO content of 1% to 7% by weight, a solids content of 20% to 70% by weight, a monomeric TDI content of less than 0.2% by weight and a monomeric methylene-diphenyl diisocyanate content of less than 2% by weight. The solvent-containing formulations can be prepared in organic solvents by reacting at least one of A) a TDI component comprising TDI isocyanurate polyisocyanates and B) an MDI component comprising diphenylmethane diisocyanates with C) a polyetherdiol. The solvent-containing formulations can be used in moisture-curing coating compositions, adhesive bonds and/or seals with substrates.

7 Claims, No Drawings

US 7,906,606 B2

MOISTURE-CURING PREPOLYMERS

CROSS REFERENCE TO RELATED PATENT APPLICATION

The present patent application claims the right of priority under 35 U.S.C. §119 (a)-(d) of German Patent Application No. 10 2004 015 986.6, filed Apr. 1, 2004.

BACKGROUND OF THE INVENTION

1. Field of the Invention

The invention relates to moisture-curing polyurethane prepolymers containing free isocyanate groups, to a process for preparing them and to their use as binders in paints and coatings.

2. Description of the Prior Art

Moisture-curing prepolymers have long been known as a constituent of one-component coating materials (e.g. H. Kittel, Lehrbuch der Lacke und Beschichtungen, 2, S Hirzel Verlag Stuttgart, Leipzig, 1998). These systems are composed of polyurethane prepolymers containing terminal free isocyanate groups (NCO groups). Following application, under the influence of atmospheric moisture, crosslinking takes place with formation of urea groups.

For rapid drying, prepolymers based on aromatic isocyanates, particularly 2,4- and possibly 2,6-diisocyanatotoluene (TDI), are most suitable.

Particularly the polyisocyanates based on the TDI grades referred to and containing isocyanurate groups constitute valuable constituents for the production of quick-drying polyurethane coatings for the wood and furniture sectors.

The reason for the rapid drying of the TDI isocyanurates is the high degree of branching. This leads to a rapid increase in the glass transition temperature in the course of crosslinking with the formation of urea groups. As a result of the high degree of crosslinking, however, rapid-drying systems of this kind are often brittle and films formed from such coating materials do not exhibit the requisite elasticity. Particularly in the case of sharp temperature changes it is thus possible for cracks to form in the coating. This is especially true of coatings on substrates which are subject to sharp fluctuations in volume, such as wood.

For flexibilization (suitability is possessed by), are suitable for example, high molecular weight polyethers for synthesizing the prepolymer. Flexibilization generally makes the polymers soft such that the drying rate is markedly retarded. In practice this means that such moisture-curing coatings based on polyurethane prepolymers dry much more slowly than, for example, the widespread combined nitrocellulose coating materials (NC lacquers).

Moreover, the compatibility of long-chain polyethers with TDI isocyanurates is limited, occasionally leading, even with smaller amounts of polyether, to products which are cloudy or lack storage stability.

It was an object of the present invention, accordingly, to provide polyurethane prepolymers allowing the preparation of coating materials and coatings which have drying rates comparable with those of NC lacquers and which at the same time achieve the requisite elasticity and the conventionally high resistance level of polyurethane coating materials.

SUMMARY OF THE INVENTION

The present invention provides solvent-containing formulations that include NCO-containing prepolymers based on TDI isocyanurate polyisocyanates and diphenylmethane diisocyanates. At least one of the prepolymers is prepared using a polyetherdiol containing ethylene oxide blocks and having a number-average molecular weight of from 3 000 to 4 500 g/mol and an ethylene oxide content of from 2 to 18% by weight, based on all the alkylene oxide units present in the diol. The formulation have an NCO content of from 1% to 7% by weight, a solids content of from 20% to 70% by weight, a monomeric TDI content of less than 0.2% by weight and a monomeric methylenediphenyl diisocyanate content of less than 2% by weight.

The present invention is also directed to a process for preparing the above-described solvent-containing formulations, where the prepolymers are prepared in the presence of organic solvents by reacting at least one of components A) and B)

A) a TDI component comprising TDI isocyanurate polyisocyanates and
B) an MDI component comprising diphenylmethane diisocyanates with
C) a polyetherdiol having a number-average molecular weight of from 3 000 to 4 500 g/mol and an ethylene oxide content of from 2 to 18% by weight, based on all of the alkylene oxide units present in the diol.

The present invention additionally provides a method of producing coatings, adhesive bonds or seals that includes combining the above-described solvent-containing formulations with one or more auxiliaries and additives selected from surface-active substances, abrasive waxes, internal release agents, fillers, dyes, pigments, flame retardants, hydrolysis inhibitors, microbicides, levelling assistants, antioxidants, UV absorbers, inert solvents and combinations thereof.

The present invention further provides moisture-curing coating compositions containing a) the above-described solvent-containing formulations,
b) optionally catalysts for accelerating the reaction of the free NCO groups with moisture and
c) auxiliaries and additives.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

It has been found that moisture-curing coating materials which combine elasticity and rapid drying can be formulated if the isocyanate component used comprises a solvent-containing formulation comprising NCO-containing prepolymers based on TDI isocyanurate polyisocyanates and diphenylmethane diisocyanates, at least one of the prepolymers having been prepared using a polyetherdiol containing ethylene oxide blocks and having a number-average molecular weight of from 3 000 to 4 500 g/mol and an ethylene oxide content of from 2% to 18% by weight, based on all of the alkylene oxide units present in the diol.

The invention accordingly provides solvent-containing formulations having an NCO content of from 1% to 7% by weight, a solids content of from 20% to 70% by weight, a monomeric TDI content of less than 0.2% by weight and a monomeric methylenediphenyl diisocyanate content of less than 2% by weight, comprising NCO-containing prepolymers based on TDI isocyanurate polyisocyanates and diphenylmethane diisocyanates, at least one of the prepolymers having been prepared using a polyetherdiol containing ethylene oxide blocks and having a number-average molecular weight of from 3 000 to 4 500 g/mol and an ethylene oxide content of from 2% to 18% by weight, based on all the alkylene oxide units present in the diol.

Further provided by the invention is a process for preparing the solvent-borne formulations, wherein NCO-containing prepolymers are prepared in the presence of organic solvents from
A) a TDI component comprising TDI isocyanurate polyisocyanates and
B) an MDI component comprising diphenylmethane diisocyanates
by reacting at least one of the two components with
C) a polyetherdiol having a number-average molecular weight of from 3 000 to 4 500 g/mol and an ethylene oxide content of from 2% to 18% by weight, based on all of the alkylene oxide units present in the diol.

Typical TDI isocyanurate polyisocyanates A) used in the preparation of the formulations of the invention include isocyanurates formed from TDI isomer mixtures of 2,4-TDI and possibly 2,6-TDI with 2,4 isomer fractions of preferably 80% to 100% by weight and 2,6 isomer fractions of 0% to 20% by weight, very preferably 80% by weight of the 2,4 isomer and 20% by weight of the 2,6 isomer, these percentages being based on the solvent-free polyisocyanate resins.

Isocyanurate polyisocyanates of TDI are obtainable by catalysed trimerization of the corresponding tolylene diisocyanates in accordance with known methods. These methods are described for example in DE-A 195 23 657 or DE-A 392 85 03.

For the preparation of the formulations of the invention the TDI isocyanurate polyisocyanates in A) are preferably used as an organic solution having an NCO content of from 7% to 8.5% by weight, a residual TDI monomer content of <0.5% by weight and a solids of from 30% to 70% by weight.

Organic solvents used may be esters, such as ethyl acetate, butyl acetate, methoxypropyl acetate, methyl glycol acetate, ethyl glycol acetate and diethylene glycol monomethyl ether acetate, for example; ketones, such as methyl ethyl ketone, methyl isobutyl ketone and methyl amyl ketone, for example; aromatics, such as toluene and xylene, for example, and also the relatively high-boiling hydrocarbon mixtures that are customary in paint chemistry. Preference is given to using butyl acetate.

As diphenylmethane diisocyanates B) it is possible to use the known MDI grades, i.e. 2,4'-MDI and 4,4'-MDI, the higher molecular weight polyisocyanates based on them, and any desired mixtures thereof with one another. Preference is given to using mixtures of monomeric methylenediphenyl diisocyanates containing 60% to 100% by weight 4,4'-MDI and 0% to 40% by weight 2,4'-MDI.

The polyetherdiols of component C) are obtainable by the technology, known per se in polyurethane chemistry, of the base-catalysed alkoxylation of suitable difunctional starter molecules. The methods commonplace for this purpose are familiar to the skilled person and are described for example in "Ullmanns Encyclopädie der industriellen Chemie", Volume A21, 1992, p. 670 ff. or in EP-A 761 708 or WO 97/40086.

Diols prepared by DMC catalysis are expressly avoided as a constituent of C), since these diols do not lead to the desired properties of the formulations of the invention.

Suitable starters for preparing the polyetherdiols are typically dihydric alcohols with no ether groups. Suitable starter molecules are dihydric alcohols such as ethylene glycol, propane-1,2- and -1,3-diol, butane-1,2-, -1,3-, -1,4- and -2,3-diol, pentane-1,5-diol, 3-methylpentane-1,5-diol, hexane-1,6-diol, octane-1,8-diol, 2-methylpropane-1,3-diol, 2,2-dimethylpropane-1,3-diol, 2-ethyl-2-butylpropane-1,3-diol, 2,2,4-trimethylpentane-1,3-diol, 2-ethylhexane-1,3-diol, higher molecular weight α,ω-alkanediols having 9 to 18 carbon atoms, cyclohexanedimethanol, cyclohexanediols or mixtures thereof.

Alkylene oxides used are preferably propylene oxide in combination with ethylene-oxide.

The monomers are preferably adducted blockwise to the starter, with the propylene oxide block preferably adducted to the starter first, so that the polyetherdiols obtainable following addition of the ethylene oxide units contain only primary OH groups.

The alkylene oxides adducted to the aforementioned difunctional starters of the polyetherdiols are preferably propylene oxide units to an extent of from 82% to 98% by weight, based on the sum of all the alkylene oxides adducted, and ethylene oxide units to an extent of from 2% to 18% by weight. With particular preference the polyethers contain 85% to 95% by weight propylene oxide units and 5% to 15% by weight ethylene oxide units.

The polyetherdiols used in C) preferably have number-average molecular weights of from 3 500 to 4 200 g/mol.

Besides the aforementioned polyetherdiols from C) it is also possible to use further polyetherpolyols, different from those of C), in preparing the prepolymer.

They are prepared using starters with a functionality of two or more. Suitable examples include polyhydric alcohols such as ethylene glycol, propane-1,2- and -1,3-diol, butane-1,2-, -1,3-, -1,4- and -2,3-diol, pentane-1,5-diol, 3-methylpentane-1,5-diol, hexane-1,6-diol, octane-1,8-diol, 2-methylpropane-1,3-diol, 2,2-dimethylpropane-1,3-diol, 2-ethyl-2-butylpropane-1,3-diol, 2,2,4-trimethylpentane-1,3-diol, 2-ethylhexane-1,3-diol, higher molecular weight α,ω-alkanediols having 9 to 18 carbon atoms, cyclohexanedimethanol, cyclohexanediols; suitable amino alcohols are, for example, 2-aminoethanol, 2-(methylamino)ethanol, diethanolamine, 3-amino-1-propanol, 1-amino-2-propanol, diisopropanolamine, 2-amino-2-hydroxymethyl-1,3-propanediol or mixtures thereof. Glycerol, trimethylolpropane, butane-1,2,4-diol, hexane-1,2,6-triol, bis(trimethylolpropane) and pentaerythritol are also suitable.

Suitable amine-based starters are polyfunctional amines, especially aliphatic or cycloaliphatic amines, such as ethylenediamine, 1,2-diaminopropane, 1,3-diaminopropane, 1,4-diaminobutane, 1,3-diamino-2-2-dimethylpropane, 4,4-diaminodicyclohexylmethane, isophoronediamine, hexamethylenediamine, 1,12-dodecanediamine or mixtures thereof.

It is preferred to use starters of the aforementioned kind, having functionalities of 2-4.

Also employed for the synthesis of the polyethers are, preferably, ethylene oxide and/or propylene oxide, particular preference being given to block polyethers based on ethylene oxide and propylene oxide.

The preparation of these polyethers which are optionally used in addition may take place either with base catalysis or by means of DMC catalysis.

These polyethers optionally used in addition typically have number-average molecular weights of from 1 500 to 4 500 g/mol, preferably 1 800 to 4 200 g/mol.

If they are used at all, their fraction, based on the sum of all the polyetherpolyols used (including the diols from C)), is 5% to 40% by weight, preferably 10% to 20% by weight.

The formulations of the invention can be prepared by a one-pot or a two-pot process.

In the case of the one-pot process the compounds from A) and B) are reacted with the polyetherdiols C) and optionally the further polyetherpolyols in the presence of catalysts and/or the stated inert solvents to form the corresponding polyurethane prepolymer. In this case the compounds from A) and B) may both be present from the start in the reaction or else first the compounds from B) are reacted partly or fully with the diols from C) and subsequently the compounds from A) are added.

In the case of the two-pot process the isocyanates from A) and B) respectively are each introduced on their own and at least one of the two is reacted with a polyether as per C) to form the prepolymer. Hence this also covers the case where only one of the two isocyanates is synthesized with the polyetherdiol from C) to form the prepolymer and the other is either not reacted at all to form the prepolymer or a prepolymer is formed from it based on other polyetherpolyols, such as can optionally be used. The reactions may be carried out in each case in the presence of catalysts and/or solvents. Following preparation of the prepolymer the prepolymers obtainable in this way, which may be present in organic solution, are then mixed with one another.

The amounts of the compounds used in A) and B) are preferably 90% to 98% by weight A) and 2% to 10% by weight B), more preferably 95% to 99% by weight % A) and 1 to 5% by weight B).

The ratio of the NCO groups of the compounds used in A) and B) to the isocyanate-reactive functions of the polyetherdiols used in C) and the polyether polyols optionally used in addition is preferably 9:1 to 16:1, more preferably 10:1 to 14:1.

The preparation of the formulations of the invention takes place typically at temperatures of from 40 to 140° C., preferably 50 to 110° C.

The urethanization can be accelerated using the conventional catalysts such as organometallic compounds, amines (e.g. tertiary amines) or metal compounds such as lead octoate, mercury succinate, tin octoate or dibutyltin dilaurate. If catalysts are used as well they are employed preferably in amounts of from 0.001 to 5% by weight, in particular 0.002 to 2% by weight, based on the overall weight of the respective subcomponents.

The solids contents of the formulations thus obtainable are typically 20% to 70% by weight, more preferably 20% to 50% by weight, it being possible if desired to adjust the solids content by adding further inert solvents of the aforementioned kind.

The formulations essential to the invention may be used for producing rapid-drying moisture-curing polyurethane coatings for woods, for example, these coatings exhibiting no propensity to form cracks even at low temperatures of –20° C.

The invention therefore further provides moisture-curing coating compositions comprising
a) the solvent-containing formulations of the invention,
b) optionally catalysts for accelerating the reaction of the free NCO groups with moisture and
c) auxiliaries and additives.

Catalysts b) that can be used for accelerating the NCO/water reaction include for example tertiary amines such as triethylamine, pyridine, methylpyridine, benzyl-dimethylamine, N,N-endoethylenepiperazine, N-methylpiperidine, pentamethyldiethylenetriamine, N,N-dimethylaminocyclohexane, N,N'-dimethyl-piperazine or metal salts such as iron (III) chloride, zinc chloride, zinc 2-ethylcaproate, tin(I) octoate, tin(I) ethylcaproate, tin(II) palmitate, dibutyltin(IV) dilaurate and molybdenum glycolate or any desired mixtures of such catalysts.

Component b), if employed at all, is used in amounts of from 0.001% to 5% by weight, preferably 0.01% to 1% by weight, based on the amount of component A).

Auxiliaries and additives optionally present in component c) may be, for example, surface-active substances, abrasive waxes, internal release agents, fillers, dyes, pigments, flame retardants, hydrolysis inhibitors, microbicides, levelling assistants, antioxidants such as 2,6-di-tert-butyl-4-methylphenol, UV absorbers of the 2-hydroxyphenylbenzotriazole type or light stabilizers of the type of the HALS compounds unsubstituted or substituted on the nitrogen atom, such as Tinuvin® 292 and Tinuvin® 770 DF (Ciba Spezialitäten GmbH, Lampertheim, DE) or other commercially customary stabilizers, as described for example in "Lichtschutzmittel für Lacke" (A. Valet, Vincentz Verlag, Hannover, 1996 and "Stabilization of Polymeric Materials" (H. Zweifel, Springer Verlag, Berlin, 1997, Appendix 3, pp. 181-213), or any desired mixtures of these compounds.

Likewise possible here as well is the addition of the inert solvents already mentioned at the beginning, for the purpose of adjusting viscosity.

Likewise possible, although not preferred, is the use besides a) of further NCO-functional prepolymers.

In preparing the coating compositions of the invention the individual components a)-c) are mixed with one another in any order.

Coating compositions based on the solvent-containing NCO-containing prepolymers of the invention can be applied to any desired substrates by conventional methods, such as by spraying, brushing, flow coating or by means of rollers or doctor blades, for example. Examples of suitable substrates include metal, wood, glass, stone, ceramic materials, concrete, hard and flexible plastics, textiles, leather or paper, preference being given to wood.

Curing can be performed at room temperature or at elevated temperature.

Examples

Unless indicated otherwise, all percentages are by weight.

The NCO content of the resins described in the inventive and comparative examples was determined by titration in accordance with DIN 53 185.

The dynamic viscosities were determined at 23° C. using a rotational viscometer (ViscoTester® 550, Thermo Haake GmbH, D-76227 Karlsruhe).

The residual monomer content was determined by means of GC in accordance with DIN 55956.

The coating materials were cured at room temperature under the influence of atmospheric moisture. The relative atmospheric humidity was in the range from 30% to 50%.

100% atmospheric humidity is understood to be the maximum amount of moisture which the air is able to hold at the corresponding temperature without producing water vapour.

Desmodur® IL 1451: TDI-based polyisocyanate containing isocyanurate groups, 50% by weight in butyl acetate, commercial product of Bayer MaterialScience AG, Leverkusen, DE).

Starting Polyisocyanates
Polyisocyanate A-I:

568 g of Desmodur® IL 1451 were admixed dropwise at 80° C. with 150 g of a polyetherdiol prepared starting from propylene glycol and having a number-average molecular weight $M_n$ of 4 007 g/mol, a propylene oxide content of 86.7% by weight and an ethylene oxide content of 13.3% by weight. After the end of the addition, stirring was continued at 80° C. until the theoretical NCO content of 5.3% by weight was reached. The prepolymer solution had a viscosity at 23° C. of 1 600 mPas and a solids content of 60% by weight in butyl acetate.

Polyisocyanate B-I 306 g of methylenediphenyl diisocyanate consisting of 65% by weight 2,4-MDI and 35% by weight 4,4'-MDI were admixed at 80° C. with 1.9 g of dibutyltin dilaurate and 694 g of a polyetherdiol prepared starting from propylene glycol and having a molecular weight of 4 007 g/mol, a propylene oxide content of 86.7% by weight and an ethylene oxide content of 13.3% by weight. After the end of the addition, stirring was continued at 80° C. until the theoretical NCO content of 16% by weight was reached. The product had a viscosity at 23° C. of 5 400 mPas.

Polyisocyanate B-II 574 g of Desmodur® VL (MDI-based polyisocyanate, Bayer MaterialScience AG, Leverkusen, DE) were admixed at 80° C. with 214.5 g of a polypropylene oxide diol prepared starting from propylene glycol and having a number average molecular weight of 2 000 g/mol and 214.5 g of a polypropylene oxide diol prepared starting from ethylenediamine and having a number-average molecular weight of 3 740 g/mol. After the end of the addition stirring was continued at 80° C. until the theoretical NCO content of 8.6% by weight was reached. The product had a viscosity at 23° C. of 2 800 mPas.

Polyisocyanate 1

Mixture of 90% by weight polyisocyanate A-1 and 10% by weight polyisocyanate B-I, solids content 50% by weight in butyl acetate as solvent, NCO content 4% by weight, viscosity at 23° C. is 224 mPas, monomer contents TDI 0.16% by weight and MDI 1.2% by weight.

Polyisocyanate 2

Mixture of 90% by weight polyisocyanate A-I and 10% by weight polyisocyanate B-I, solids content 50% by weight in butyl acetate as solvent, NCO content 5.1% by weight, viscosity at 23° C. is 134 mPas, monomer contents TDI 0.16% by weight and MDI 1.7% by weight.

Polyisocyanate 3

1110 g of Desmodur® IL 1451 and 46 g of an MDI isomer mixture made up of 65% by weight 2,4-MDI and 35% by weight 4,4'-MDI were introduced into a vessel with 0.015 g of Irganox® 1076 (sterically hindered phenolic antioxidant, Ciba Geigy, Basel, CH). Subsequently at 80° C. 404 g of a polyetherdiol prepared starting from propylene glycol and having a molecular weight of 4007 g/mol, a propylene oxide content of 86.7% by weight and an ethylene oxide content of 13.3% by weight were added dropwise. After the end of the addition stirring was continued at 80° C. until the theoretical NCO content of 5.7% by weight was reached. Then 438 g of butyl acetate were added. The product had an NCO content of 4% by weight, a viscosity at 23° C. of 538 mPas at a solids content of 50% by weight, a free TDI content of 0.08% by weight and a free MDI content of 1.2% by weight.

Polyisocyanate 4: (Comparative)

568 g of Desmodur® L 1451 were admixed dropwise at 80° C. with 250 g of a polyetherdiol prepared starting from propylene glycol and having a molecular weight of 4007 g/mol, a propylene oxide content of 86.7% by weight and an ethylene oxide content of 13.3% by weight. After the end of the addition stirring was continued at 80° C. until the theoretical NCO content of 4.5% by weight was reached. Then 800 g of butyl acetate were added. The product had an NCO content of 1.8% by weight, a viscosity at 23° C. of 83 mPas and a solids content of 33% by weight. The product obtained is cloudy.

Polyisocyanate 5: (Comparative)

568 g of Desmodur® IL 1451 were admixed dropwise at 80° C. with 250 g of a polyetherdiol prepared starting from propylene glycol and having a molecular weight of 4007 g/mol, a propylene oxide content of 77.7% by weight and an ethylene oxide content of 22.3% by weight. After the end of the addition stirring was continued at 80° C. until the theoretical NCO content of 4.5% by weight was reached. Then 250 g of butyl acetate were added. The product had an NCO content of 3.3% by weight, a viscosity at 23° C. of 1 540 mPas and a solids content of 50% by weight. The product obtained is clear.

Polyisocyanate 6: (Comparative)

695 g of Desmodur® IL 1451 were admixed dropwise at 80° C. with 305 g of Acclaim® 2200 (difunctional polyether based on propylene oxide, molecular weight $M_n$ 2000 g/mol, Bayer MaterialScience AG, Leverkusen, DE). After the end of the addition stirring was continued at 80° C. until the theoretical NCO content of 3.8% by weight was reached. The product solidified after 2 weeks' storage at room temperature and no longer dissolved in the conventional paint solvents.

Polyisocyanate 7: (Comparative)

695 g of Desmodur® IL 1451 were admixed dropwise at 80° C. with 305 g of Acclaim® 8000 (difunctional polyether based on propylene oxide, molecular weight $M_n$ 8000 g/mol, Bayer MaterialScience AG, Leverkusen, DE). After the end of the addition stirring was continued at 80° C. Even before the theoretical NCO content was reached, the product was solid and no longer dissolved in conventional paint solvents.

Polyisocyanate 8 (Comparative)

555 g of Desmodur® IL 1451 and 23 g of an MDI isomer mixture made up of 65% by weight 2,4'-MDI and 35% by weight 4,4'-MDI were introduced into a vessel. Subsequently at 80° C. 202 g of a polyether polyol prepared starting from ethylene-diamine and having a molecular weight of 3740 g/mol and a propylene oxide content of 100% by weight were added dropwise. After the end of the addition stirring was continued at 80° C. until the theoretical NCO content of 5.0% by weight was reached. Then 236 g of butyl acetate were added. The product had an NCO content of 3.9% by weight, a viscosity at 23° C. of 630 mPas at a solids content of 50% by weight. The product was cloudy.

Technical Coatings Analyses

Polyisocyanates 1 to 5 were formulated as primer and topcoat material in accordance with the following base formulas:

Primer Formulation:

The respective polyisocyanate was diluted with butyl acetate to 35% by weight and then mixed with 3% by weight of, based on the total solids content, of the abrasive wax Ceraflour® 994, BYK Chemie, Wesel, DE.

Topcoat Formulation:

The respective polyisocyanate was diluted with butyl acetate to 35% by weight.

The Following Tests were Carried Out:

The stabilities were determined by observing the change in viscosity after 15 days at room temperature and an atmospheric humidity of 30% to 50% in open bottles with an aperture diameter of 21 mm and a volume of 125 ml. The stabilities were designated OK if the ratio of efflux time after storage to efflux time before storage was <2. The efflux times were determined in accordance with DIN 53211.

Cold Check Test 2 primer coats and 2 topcoats each of 100 to 120 g/m² were applied by spraying to a veneered chipboard panel (20×40 cm) with a dark stain (e.g. Lignal Hydro-Lasurbeize Bo 18-21946 from Lignal, DE). The coatings were dried overnight at room temperature. The coatings were subsequently stored at 50° C. for 24 hours and then at room temperature for a further 24 hours.

For the cold check test the coatings were subjected thereafter to 30 cycles, each cycle being composed of one hour of storage at −20° C. followed by one hour of storage at 50° C. At the end of the storage period a visual assessment was made to determine whether cracking has occurred in the coating. The coatings passed the test (rated OK) if no cracking was observed.

Dry-To-Touch Drying:

The dry-to-touch drying was determined on the topcoat formulation.

The finished coating materials were for this purpose drawn onto glass plates with the requisite wet film thickness (150, 210 µm) and dried at room temperature (RT). At fixed intervals of time, guided by the anticipated end time, a pressure of 2-3 kPa (tested beforehand on a balance if appropriate) is exerted on the film using the thumb. The time at which under obliquely incident light an impression can no longer be seen is taken as the end point of the determination.

Pendulum hardness of the topcoat by the König method was determined in accordance with DIN 53157.

|  | Test | | | | | | | | | |
|---|---|---|---|---|---|---|---|---|---|---|
|  | A | B | C | D | E | F | G | H | I | J |
| Polyisocyanates | 1 | 2 | 3 | A-1 | 4 | 5 | 6 | 7 | 8 | NC** |
| Cleraflour ® 994 in % van Byk Chemie | 3 | 3 | 3 | 3 | 3 | 3 | — | — | — | — |
| Solids in % | 35 | 35 | 35 | 35 | 35 | 35 | 35 | 35 | 50 | 20 |
| Appearance | clear | clear | clear | clear | cloudy | clear | clear | cloudy | cloudy | clear |
| Dry-to-touch drying | 25 | 30 | 25 | 30 | 30 | 25 | — | — | — | 20 |
| Pendulum hardness in s | 130 | 140 | 170 | 140 | 120 | 140 | — | — | — | 140 |
| Cold check test | OK | OK | OK | not OK | OK | OK | — | — | — | — |
| Stability | OK | OK | OK | not OK | not OK | not OK | not OK | not OK | — | OK |

**Nitrocellulose lacquer consisting of 13% Alkydal ® E41 (alkyd resin 70% in xylene, viscosity at 23° C. 2600 mPas, Bayer MaterialScience AG, Leverkusen), 17% NC 510, (nitrocellulose lacquer, 35% in isopropanol, Wolff Walsrode AG, Walsrode, DE), 42% ethyl acetate, 11% methyl isobutyl ketone and 17% acetone.

The coatings produced from the polyisocyanates 1-3 (tests A-C) show good drying behaviour (touch drying <30 min), sufficiently high pendulum hardnesses (>100 s), they pass the cold check test, and the stability of the primer formulations is adequate.

The coatings from polyisocyanate A-1 (test D, purely TDI-based) do not withstand the cold check test without damage, and the stability of the primer is inadequate.

The coatings from polyisocyanate 4 (test E) are based on a polyisocyanate having a relatively high polyether content but with the same type of polyether as in the case of polyisocyanate 4. Polyisocyanate 5 is cloudy and consequently not suitable for producing coatings.

In the case of polyisocyanate 5 (test F) the polyether has a higher ethylene oxide content as compared with the polyether from polyisocyanate 4. Although the polyisocyanate is clear the stability of the formulation is inadequate.

Polyisocyanates 6 and 7 (tests G and H) are based on long-chain Acclaim® polyethers without a polyethylene oxide block. Since these solid products are insoluble, their further processing was impossible.

Polyisocyanate 8 (test I) is based on a TDI isocyanurate/MDI mixture and a purely PO-based polyether with a functionality of 4. A polyetherdiol with an EO block, which is essential for the present invention, was not included. The prepolymer was cloudy and hence is unsuitable for producing homogeneous coatings which are optically flawless.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing solvent-containing formulations comprising NCO-containing prepolymers based on TDI isocyanurate polyisocyanates and diphenylmethane diisocyanates wherein the formulation has an NCO content of from 1% to 7% by weight, a solids content of from 20% to 70% by weight, a monomeric TDI content of less than 0.2% by weight and a monomeric methylenediphenyl diisocyanate content of less than 2% by weight, the process comprising
   i) preparing, separate from the prepolymer of step ii), a prepolymer in the presence of organic solvents from isocyanate components A):
      A) a TDI component comprising TDI isocyanurate polyisocyanates,
   ii) preparing, separate from the prepolymer of step i), a prepolymer in the presence of organic solvents from isocyanate components B):
      B) an MDI component comprising diphenylmethane diisocyanates, and
   iii) mixing the resulting prepolymers to form the solvent containing formulation,
   wherein at least one of the prepolymers is prepared by reacting the isocyanate component with
      C) a polyetherdiol having a number-average molecular weight of from 3 000 to 4 500 g/mol and an ethylene oxide content of from 2 to 18% by weight, based on all of the alkylene oxide units present in the diol,
   and if one of the two prepolymers is not prepared using component C), it is prepared by reacting the isocyanate component with a polyetherpolyol other than component C).

2. The process for preparing solvent-containing formulations according to claim 1, wherein the compounds from A) are used in amounts of from 95% to 99% by weight and the compounds from B) are used in amounts of from 1% to 5% by weight, based on the total amount of A) and B).

3. Solvent-containing formulations prepared from the process of claim 1.

4. A method of producing coatings, adhesive bonds or seals comprising combining the solvent-containing formulations according to claim 3 with one or more auxiliaries and additives selected from the group consisting of surface-active substances, abrasive waxes, internal release agents, fillers, dyes, pigments, flame retardants, hydrolysis inhibitors, microbicides, levelling assistants, antioxidants, UV absorbers, inert solvents and combinations thereof.

5. Moisture-curing coating compositions comprising
 a) solvent-containing formulations according to claim 3,
 b) optionally catalysts for accelerating the reaction of the free NCO groups with moisture and
 c) auxiliaries and additives.

6. Coatings, adhesive bonds and/or seals obtained from solvent-containing formulations according to claim 3.

7. Substrates coated with coatings according to claim 6.

\* \* \* \* \*